(12) United States Patent
Simon

(10) Patent No.: US 9,030,552 B2
(45) Date of Patent: May 12, 2015

(54) METHOD FOR CALIBRATING A MEASUREMENT INSTRUMENT OF AN OPTRONIC SYSTEM

(75) Inventor: Alain Simon, Les Mesnuls (FR)

(73) Assignee: Thales, Courbevoie (FR)

( * ) Notice: Subject to any disclaimer, the term of this patent is extended or adjusted under 35 U.S.C. 154(b) by 522 days.

(21) Appl. No.: 13/516,731

(22) PCT Filed: Dec. 13, 2010

(86) PCT No.: PCT/EP2010/069533
§ 371 (c)(1),
(2), (4) Date: Jun. 16, 2012

(87) PCT Pub. No.: WO2011/073144
PCT Pub. Date: Jun. 23, 2011

(65) Prior Publication Data
US 2012/0257050 A1 Oct. 11, 2012

(30) Foreign Application Priority Data

Dec. 18, 2009 (FR) ...................................... 09 06173

(51) Int. Cl.
*H04N 17/00* (2006.01)
*G01S 5/16* (2006.01)
*G01S 11/12* (2006.01)

(52) U.S. Cl.
CPC ...... *G01S 5/163* (2013.01); *G01S 11/12* (2013.01)

(58) Field of Classification Search
USPC .............. 348/135, 141, 142; 382/154; 702/94
See application file for complete search history.

(56) References Cited

U.S. PATENT DOCUMENTS

| | | | |
|---|---|---|---|
| 6,101,455 A | | 8/2000 | Davis |
| 7,239,976 B2 * | | 7/2007 | Coleman et al. .............. 702/153 |
| 2008/0109182 A1 * | | 5/2008 | Min et al. ..................... 702/104 |

FOREIGN PATENT DOCUMENTS

| | | |
|---|---|---|
| WO | 2005/114567 A1 | 12/2005 |
| WO | WO 2005114567 A1 * | 12/2005 |

OTHER PUBLICATIONS

Mangel, M., "Three Bearing Method for Passive Triangulation in Systems with Unknown Deterministic Biases," IEEE TAES, Vol., No. 6, pp. 814-819 (1981).

(Continued)

*Primary Examiner* — Christopher S Kelley
*Assistant Examiner* — Zhihan Zhou
(74) *Attorney, Agent, or Firm* — Baker Hostetler LLP

(57) ABSTRACT

A method for calibrating measurement instruments of an optronic system in motion, with positions $P_1, P_2, \ldots, P_i, \ldots$, comprises: a device for acquiring images of a scene comprising a fixed object $G_0$; and means for tracking the fixed object $G_0$ during the acquisition of these images; means for obtaining the positions $P_1, P_2, \ldots$; at least one instrument for measuring the distance and/or an instrument for measuring angles of orientation and/or of attitude between this measurement instrument and the fixed object $G_0$, according to a line of sight LoS. It comprises the following steps: acquisition at instants $t_1, t_2, \ldots$ of at least two images, each image being acquired on the basis of different positions $P_1, P_2, \ldots$ of the system, the fixed object $G_0$ being sighted in each image, but its position being unknown; acquisition at the instants $t'_1, t'_2, \ldots$ of measurements of distance and/or of angle; synchronization of the measurements of distance and/or of angle with the positions $P_1, P_2, \ldots$ established at instants $t_1, t_2, \ldots$; estimation of the measurement defects which minimize the dispersion of at least two points of intersection $G_{ij}$ between the LoS at the position $P_i$ and the LoS at the position $P_j$, as a function of said measurements and of the known positions $P_i$, $P_j$ of the system.

10 Claims, 5 Drawing Sheets

(56) References Cited

OTHER PUBLICATIONS

"Air Reconnaissance Primary Imagery Data Standard," Edition 4, North Atlantic Council Document AC/244-D(2006) 0013 AC/224(JISCCG)D(2006)0005, 206 pages (Mar. 14, 2006).

Dong, Y. et al., "A Generalized Least squares Registration Algorithm with Earth-Centered Earth-Fixed (ECEF) Coordinate System," 3rd International Conference on Computational Electromagnetics and its Applications Proceedings, pp. 79-84 (2004).

Li, H. et al., "A Real-Time Bias Registration Algorithm for Multradar Systems," 7th International Conference on Signal Processing (IEEE), pp. 2025-2028 (2004).

Pittelkau, M. E., "Calibration and Attitude Determination with Redundant Inertial Measurement Units," Journal of Guidance, Control, and Dynamics, vol. 28, No. 4, pp. 743-752 (Jul.-Aug. 2005).

Seilhorst, T. et al., "Advanced Medical Displays: A Literature Review of Augmented Reality," Journal of Display Technology, vol. 4, No. 4, pp. 451-467 (Dec. 2008).

Renaud, P. et al., "Optimal pose selection for vision-based kinematic calibration of parallel mechanisms," Conference on Intelligent Robots and Systems. Las Vegas, NE, IEE/RSJ, six pages (2003).

\* cited by examiner

METHOD FOR CALIBRATING A MEASUREMENT INSTRUMENT OF AN OPTRONIC SYSTEM

CROSS-REFERENCE TO RELATED APPLICATIONS

This application is a National Stage of International patent application PCT/EP2010/069533, filed on Dec. 13, 2010, which claims priority to foreign French patent application No. FR 0906173, filed on Dec. 18, 2009, the disclosures of which are incorporated by reference in their entirety.

FIELD OF THE INVENTION

The field of the invention consist of the calibration of an optronic system in motion whilst viewing a fixed point for the benefit of the location thereof or the pointing thereof. This system is equipped with measurement instruments making it possible to perform measurements of angles and/or distances of the fixed point sighted. The invention relates more precisely to the calibration of these measurement instruments installed in the system.

BACKGROUND

Examples of these measurement instruments include: platform navigation systems, sensors for scene detection and analysis and, in certain instances, weapons to deter or assail targets in security or combat missions.

The navigation system traditionally uses, for its positioning, an inertial rig comprising gyrometers, accelerometers and processing operations for the platform attitude calculation; a GPS as well as a barometer also contribute to its positioning and their measurements are fused with the inertial measurements, for better quality of the general navigation solution.

Systems for scene detection and analysis comprise optronic sensors with detectors operating from the visible region to the infrared for acquiring a video of the scene, a telemeter for measuring the distance thereto. The line of sight (or LoS) of the sensor has an ability to orient itself with agility so as to rapidly acquire a zone of the scene corresponding to the instantaneous field of vision of the sensor. Inertial measurement units or other opto-mechanical devices are further used to measure the attitude of the LoS with respect to a reference of the sensor or in an absolute manner.

Weapons systems comprise inertial and positioning means for guiding munitions toward their objectives. They may moreover use homing heads based on optronic imaging or radar to correct their terminal guidance onto the designated targets.

In the conventional calibration procedures, the instruments or equipment need to be aligned with the reference system of the platform and their respective positionings need to be "harmonized".

This optronic system is generally installed on a platform aboard an aircraft or more generally aboard a vehicle whose known position is for example provided by an inertial rig.

The determination of the defects of mounting of the system on the platform and of the defects of the measurements performed by the instrument is a step prior to any location or pointing procedure, in particular when the latter involves measurement instruments distributed over the system.

Mounting defects are manifested by a non-alignment of the reference axes of the coordinate frame of the platform with those of the coordinate frame of the measurement instrument. The operation of measuring the angles representing the transformation between coordinate frames is a procedure dubbed harmonization, when it entails mutually orienting the measurement instruments; or alignment when it entails orienting (or positioning) them in relation to the reference coordinate frame of the system (boresight alignment).

In addition to the errors of orientation related to the reference axes of the measurements of angles (in particular demarcated by the axes of gyrometers in inertial systems), the mounting of a sensor on a platform of airborne type introduces deviations of orientation between the reference axes of the platform and of the sensor of possibly as much as several degrees. A commonplace value of the errors in the knowledge of the mounting angles is of the order of 10 mrad.

These errors originate from the production of various hardware components such as the quartz, which regulates clocks, the accelerometers, which measure accelerations, and demarcate the directions of axes around which gyrometers measure angular speeds.

The attitude of the system is typically marred by an error of about 1 mrad when the information arises from an inertial rig of aeronautical class.

Instruments for measuring angles and/or distances commonly introduce a bias of a few milli-radians.

During operation, the platform and the reference axes may undergo mechanical and thermal deformations in particular caused respectively by a strong acceleration or deceleration and by the variation in the flying height. These thermomechanical constraints induce, on the measurements, a bias of possibly as much as a few mrad.

Among measurement defects may be cited, notably, noise, biases, scale factors and drifts. The scale factor is manifested by a deviation of the magnitude measured with respect to the true value whose value is proportional to the value of the magnitude. Its order of magnitude is a few tens of parts per million (ppm for short). The drift is manifested by a deviation in the magnitude, which grows over time from a date at which the latter was corrected. One speaks of slow drift if the increase is small in relation to the value. When the time span of the measurements is small enough for the deviation in drift not to be important, it may be processed as an extra bias over the time interval considered.

For the measurements of angles the specific mounting values may be of the order of about ten degrees whereas the aggregate of the defects leads to residual errors of about 10 mrad. The translations between the coordinate frames of the platform represent deviations of possibly as much as a few meters with residual errors, which are controlled so as to be a few centimeters.

The parameters that we propose to estimate relate equally well to the defect of a measurement of an apparatus pertaining to on-line information as to the mounting of the equipment on the platform.

There exist several calibration schemes with variations inherent to the field of application.

In the field of metrology, measurement is necessary for any knowledge, for any decision taking and for any action. Characterization of the defects of measurement instruments constitutes a systematic step within the production of elementary instruments or sensors integrated within complex systems or sensors. This characterization is manifested in a conventional manner by the estimation of properties (bias, scale factor, etc.) of the physical magnitudes (angle, distance, etc.), characterized by their statistical values (mean, standard deviation, etc.) over the field of use of the system.

The metrology operations are generally performed on the ground on test beds and in a very precise manner but under particular measurement conditions which cannot always reflect the real conditions of use. These calibration procedures are expensive, laborious, and difficult to carry out through lack of room within the equipment; moreover the realization on the ground of the conditions of acquisition (distance, temperature, mechanical constraint) and of modeling remains limited by the knowledge of the phenomena.

To determine the ground alignment, the metrology operations are lengthy and consume specific means. They have moreover to be potentially repeated, thus rendering them very expensive and unsuited to fast and practical use of the instruments on mobile platforms.

Moreover, measurement instruments are subject to phenomena of temporal drift and aging that may modify their bias. This assumes a strategy of maintaining operational condition (MCO), with plans regarding resumption of testing and calibration.

In the field of industry, and for robotic applications, means are commonly implemented to carry out the calibration of pose (position and orientation) of mechanical items or parts relating to a fixed or mobile structure as described in the article by P. Renaud and co-authors "Optimal pose selection for vision-based kinematic calibration of parallel mechanisms", Proceedings of the 2003 IEE/RSJ. Conference on Intelligent Robots and Systems. Las Vegas. Nev. October 2003.

These operations traditionally consist in estimating the position and the orientation of the mechanical part or item in relation to a fixed or mobile structure on the basis of a model.

The measured information is of high precision but often relative. For our application, a scheme making it possible to directly evaluate the global orientation is sufficient and absolute information is sought.

Moreover the calibration of the systems with which we are concerned often exhibit a significant number of joints or gimbals (see for example FIGS. 10, 15, 16, 17 in "Air Reconnaissance Primary Imagery Data Standard" Edition 4 of 14 Mar. 2006).

In the medical setting, in conjunction with robotics and enhanced reality, means are being developed for assisting tricky operations requiring accuracy of positioning in surgical interventions, as described for example in T. Sielhorst T and co-authors "Advanced Medical Displays—A Literature Review of Augmented Reality", J. of Display technology, Vol 4 No 4 Dec. 2008

The solutions afforded in respect of the medical field cannot be produced in a dynamic and non-cooperating setting. In these applications, knowledge of the setting makes it possible for example to prearrange markers or to learn certain characteristics of the environment so as to position and orient the equipment used. Moreover the information produced is often relative, whereas for the location or pointing application, absolute information is sought.

In medicine, as for the other applications mentioned, the processes are not autonomous since they are based on reference data (considered to be exact) on the environment, or on exchanges of information in the form of cooperation between distributed systems or on a specific intervention of the user.

To position an object by triangulation in the presence of bias, certain authors such as Mangel in "Three bearing method for passive triangulation in systems with unknown deterministic biases", IEEE TAES Vol 7 No 6 Nov. 1981, have favored schemes able to provide a solution which is not too disturbed by their presence. But these approaches do not afford finer knowledge of the system so that it can be better utilized under new conditions.

In the field of positioning and navigation, fairly recent works seek to correct measurement defects by using physical redundancies (duplication of the measurement instruments) or software. These approaches relate essentially to GPS positioning and orientation systems (INS), such as described by Pittelkau in "Calibration and Attitude Determination with Redundant Inertial Measurement Units", J. of Guidance Control and Dynamics. Vol. 28, No. 4, July-August 2005.

But the use of physical redundancies exhibits recurrent costs and makes it necessary to borrow existing architectures. Problems regarding bulkiness and room available within the equipment must also be taken into account. Finally they do not make it possible to measure the alignments on all the useful gimbals for the system.

In the military field, the fusion of data entails specific needs and in particular with the need for associating diverse data:

For multi-sensor tracking, academic works have been concerned with the training of surveillance radar antennas on Geographic North so as to improve the tracking of aircraft by several radars on the scale of a country or even a continent. Within this framework may be cited the work carried out by:

Li and co-authors "A real-time bias registration algorithm for multiradar systems", 7th International Conference on Signal Processing (IEEE) 2004, or else, Dong and co-authors "A generalized least squares registration algorithm with Earth-centered Earth-fixed (ECEF) coordinate system", 3d International Conference on Computational Electromagnetics and Its Applications Proceedings 2004, For location in the presence of angular bias, the calibration (or boresighting) operation consists in carrying out an adjustment which makes it possible to align the Line of Sight (or "LoS") on the sighting axis of the optronic system installed on a platform.

For the exchange of information between distributed sensors, the necessity for interoperability favors the development of normalization, in the realms of positioning and of fusion between heterogeneous sources. STANAG 5516, the acronym standing for the expression "STANdard AGreement", reserves specific fields (designated by PPLI for Precise Participant Location and Identification) to allow the exchange of the known positions between the participants of the network for cooperative calibration.

For applications using cooperating measurement instruments, data fusion offers advantages in terms of autonomy and independence to the environment. On the other hand, they pose constraints relating to the number and distribution of measurement instruments and require means of communication and information exchange to these instruments, as well as an identification of common objects to which the information to be reconciled pertains. This situation does not correspond to the desired use.

Airborne measurement instruments evolve under fairly different thermomechanical conditions from what may generally be reproduced on the ground under realistic conditions with all the diversity encountered in their area of operation.

Whatever the area of application, these locating instruments require systematic and periodic checking in order to manage their temporal drift and their aging.

Calibration procedures are expensive, laborious, and difficult to carry out through lack of room within the equipment; it is also difficult to realize on the ground the conditions of acquisition (distance, temperature, mechanical constraint)

and of realistic modeling which remains limited by the knowledge of the phenomena.

SUMMARY OF THE INVENTION

The aim of the invention is to remedy these drawbacks. More precisely, it entails reducing the cost of the calibration and its maintenance, while improving its precision and its stability for applications where one seeks to improve in an autonomous and permanent manner:
- the locating of non-cooperating objects on the basis of passive measurements and/or distance measurements
- the pointing of the sensor on the basis of measurements of angles.

The subject of the invention is a method for calibrating measurement instruments of an optronic system in motion, with positions $P_1, P_2, \ldots, P_i, \ldots$, this optronic system comprising:
- a device for acquiring images of a scene comprising a fixed object $G_0$, and
- means for tracking the fixed object $G_0$ during the acquisition of these images,
- means for obtaining the positions $P_1, P_2, \ldots$
- at least one instrument for measuring the distance and/or one instrument for measuring angles of orientation and/or of attitude between this measurement instrument and the fixed object $G_0$, according to a Line of Sight (LoS), It is principally characterized in that it comprises the following steps:
- acquisition at instants $t_1, t_2, \ldots$ of at least two images, each image being acquired on the basis of different positions $P_1, P_2, \ldots$ of the system, the fixed object $G_0$ being sighted in each image, but its position being unknown,
- acquisition at the instants $t'_1, t'_2, \ldots$ of measurements of distance and/or of angle,
- synchronization of the measurements of distance and/or of angle with the positions $P_1, P_2, \ldots$ established at instants $t_1, t_2, \ldots$,
- estimation of the measurement defects which minimize the dispersion of at least two points of intersection $G_{ij}$ between the LoS at the position $P_i$ and the LoS at the position $P_j$, as a function of said measurements and of the known positions $P_i, P_j$ of the system.

This method makes it possible to carry out autonomous calibration (without resorting to an external action or information), in-situ (under operational conditions), or within the operational setting, by evaluating the values obtained under the conditions of use, thus representing an advantage in respect of the calibration need of airborne optronic systems.

In regard to applications of ground metrology or cooperative calibration based on a network, the novelty of the proposed approach is that it operates on the basis of a single measurement instrument, in an automatic and autonomous manner, without requiring human intervention or exact knowledge about the context of acquisition.

According to a characteristic of the invention, the sole calibrated measurement instrument is an instrument for measuring angles of orientation and/or of attitude; the measurements are then acquired on the basis of at least three different positions $P_1, P_2, P_3$.

According to another characteristic of the invention, the sole calibrated measurement instrument is a telemeter, and the measurements are acquired on the basis of at least two different positions.

When at least one other fixed object $G_1$ is visible on at least two images, it optionally furthermore comprises a step of matching between each image of the fixed objects $G_0, G_1$, the step of calculating the measurement defects furthermore being carried out as a function of predetermined characteristics or parameters internal to the sensor (such as the size and the dimensions of the elements of the photo-sensitive matrix, the focal length, the Image Principal Point, the optical distortion). Note that with sufficient available measurements, these magnitudes can also be estimated by linearizing the picture-taking equations of the sensor around the approximate values. Moreover some of these parameters, such as the focal length and the distortion, fluctuate more particularly with temperature.

Preferably, it comprises a step of calculating the geographical position of $G_0$ and optionally of the other fixed objects, on the basis of the calibrated measurements.

According to a variant, it comprises a step of pointing at the fixed object $G_0$.

According to a characteristic of the invention, it comprises a step of optimizing the measurement conditions, which is based on the determination of an optimal trajectory of the sensor for a known position of the object $G_0$, or on the determination of a zone to be favored for the search for the object $G_0$.

According to another characteristic of the invention, it comprises a step consisting in applying the calculated defects to the measurements.

This method exhibits numerous advantages since it improves:
- the performance of direct geo-referencing of the image, thereby allowing better location of all its points,
- the absolute pointing of the LoS, thus making it possible in particular to place an object of known coordinates as close as possible to the center of an image and thereby even to reduce the lags in respect of its acquisition and its analysis.

Furthermore:
- it is autonomous, requiring neither intervention or monitoring of the operator, nor reference data on the environment,
- it operates in a commonplace mode of use of measurement instruments,
- it does not require any complex trajectory of the platform to afford utilizable performance,
- it appreciably relaxes the requirements on the precision of pointing of the LoS which have to be allocated during the specification of the system,
- it lightens the metrological need aimed at the grading of the ground boresighting and thus avoids difficult ground procedures that would be lengthy and expensive and that would have to be repeated.

The subject of the invention is also an optronic system able to be displaced, which comprises:
- a device for acquiring images of a scene comprising a fixed object $G_0$,
- means for tracking the fixed object $G_0$ during the acquisition of these images,
- means for obtaining the positions $P_1, P_2, \ldots$
- at least one instrument for measuring the distance and/or one instrument for measuring angles of orientation and/ or of attitude between this measurement instrument and the fixed object $G_0$, according to a line of sight.

It is characterized in that it comprises means for implementing the method as previously described.

The calibration and alignment procedures correspond to the term "registration" in certain fields. In the world of image processing, one commonly speaks of "registration of images", which corresponds to the action making it possible to superimpose the contents of several images for example.

BRIEF DESCRIPTION OF THE DRAWINGS

Other characteristics and advantages of the invention will become apparent on reading the detailed description which follows, given by way of nonlimiting example and with reference to the appended drawings in which.

Across the figures, the same elements are tagged by the same references.

DETAILED DESCRIPTION

Figure 1:
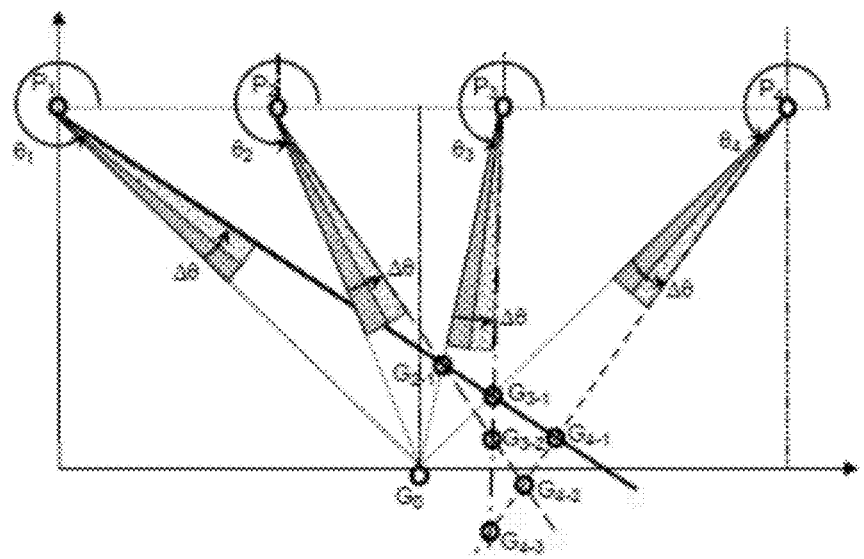
FIG. 1 schematically illustrates the dispersion of erroneous positions obtained on the basis of four different positions, FIG. 2 schematically represents an exemplary optronic system equipped with means for calibrating a measurement instrument, FIG. 3 schematically represents the axes of the coordinate frame of the system and those of the coordinate frame of the measurement instrument, FIG. 4 schematically represents a simple configuration of measurements for a calibration process (A(L)RFM) for bias and scale factor like angle and distance measurement defect.

The optronic system of interest comprises:
a platform making it possible to carry out the displacement of the system, the measurement of its positioning and the mounting of the optronic sensor,
an optronic sensor constituting the instrument making it possible to image and sight a fixed point on the ground $G_0$ on which measurements of angles and/or of distances are carried out.

Hereinafter a system installed aboard an aircraft will be taken as example, but it could equally well be installed in a robot or a terrestrial platform or even be carried directly by a user. The term "platform" is therefore used in its most generic form.

The method according to the invention rests upon:
the displacement of the optronic system over time;
the means for acquiring a fixed point of interest (or object) $G_0$;

The means for acquiring a fixed point cover the determination of an appropriate zone of the scene, the choice of a relevant object and its temporal tracking. This tracking may be manual or automatic. The ability for automatic tracking of the object consists in keeping it maintained at the center of the image during the displacement of the system over time (that is to say in the course of the sequence of images acquired by the sensor). This is carried out by measuring its apparent displacement (deviometry) between a reference image and the current image. In order for this displacement measurement to be possible, it is necessary for the object to have been "locked onto" beforehand, that is to say detected and located in the image. Lock-on allows automatic initialization of tracking.
means for acquiring successive images of a zone comprising this fixed point $G_0$,
the measurement of angles and/or distances between the measurement instrument and the object sighted $G_0$;
the knowledge of the absolute coordinates of the positions $P_i$ of the system at the measurement instants;
a processing of the successive measurements to make it possible to estimate the best values of defect allowing for the immobility of the point sighted $G_0$.
a small variation of the parameters to be calibrated on the scale of the duration of gathering of the measurements useful for their estimation.
means for measuring the thermodynamic magnitudes on the most sensitive measurement components (temperature for example) so as to allow a temporal analysis of the behavior according to various operating conditions and to forecast during use the a priori values of the parameters to be estimated according to the values learnt from the previous calibration procedures.

When the system is considered to be in "tracking mode" pursuing an object of the scene this signifies that its position (or its pixel coordinates) in the image is kept constant during the acquisitions. In the most frequent case, the tracking mode makes it possible during the displacement to keep the object $G_0$ at the center of the images of the sequence constituting the optronic video. The less frequent case of tracking with respect to the fixed object, imaged outside of the image center, also makes it possible to carry out the process.

The measurements grade the picture-taking parameters of the image acquisition device.

The proposed scheme subjects the positions $G_{ij}$ obtained by the set of measurements acquired over time, to the constraint of positioning a fixed point $G_0$ for the various positions $P_1, P_2, \ldots$, of the optronic system.

Figure 3:
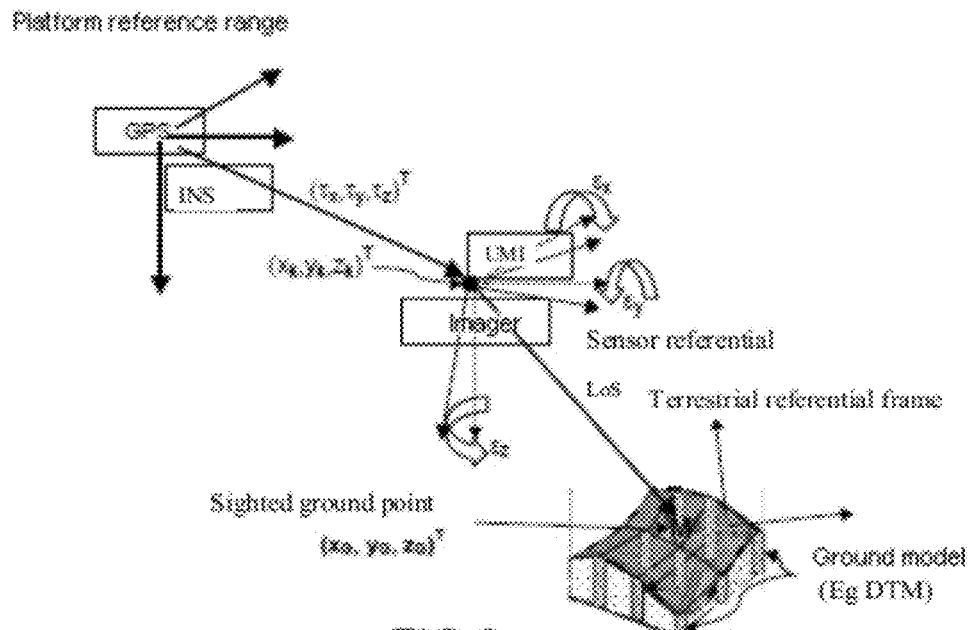

Instrument mounting or/and measurement defects in fact produce position solutions for the fixed object $G_0$ that differ from one another as well as from reality. With each position $P_i$ of the system are associated the measurements taken at these positions: this is designated the measurement ensemble. The N measurement ensembles (position of the system, angle and/or distance) provide N positions, which on account of the measurement errors do not coincide at a single point but exhibit dispersion. The dispersion between the measurements constitutes a signature of the defects for given picture-taking conditions (trajectory of the system, angles considered, thermodynamic operating condition). This is illustrated in FIG. 1 with measurements of angles about a single direction; represented in this figure are four known positions $P_1, P_2, P_3, P_4$ of the platform, as well as the real position $G_0$ of the fixed object. The measurement defect introduces an error $\Delta\theta$ in the LoS of the measurement instrument, $\theta$ being the angle of rotation in the plane as illustrated in FIG. 3. If the LoSs were perfectly aligned, they would all cross at $G_0$. In fact, they cross at several dispersed points. The LoS arising from $P_1$ crosses at $G_{12}$ with the LoS arising from $P_2$, at $G_{13}$ with the LoS arising from $P_3$, at $G_{14}$ with the LoS arising from $P_4$. Likewise, the LoS arising from $P_2$ crosses in $G_{23}$ with the LoS arising from P3, at $G_{24}$ with the LoS arising from $P_4$. Finally, the LoS arising from $P_3$ crosses at $G_{34}$ with the LoS arising from $P_4$. On the basis of N measurements (one ensemble of measurements per position P) it is thus possible to construct $N(N-1)/2$ positions whose distribution signs the measurement defects $\Delta\theta$ as illustrated in the example hereinabove for one dimension.

By generalizing to three dimensions, the angle of rotation of the image about the direction of pointing of the LoS is considered in addition to the two angles characterizing the said direction. The mechanization (assembling) of the various sensors on the platform leads to the consideration of various coordinate frames, whose axes and origins are distributed within the system, such as notably:
the antenna of the receiver of the GPS,
the inertial navigation rig (CNI) of the platform, the image principal point (PPI) or optical center of the imager.

The passage from each of these coordinate frames to the others is described by a transformation of the (Translation and Rotation) type.

Figure 6:
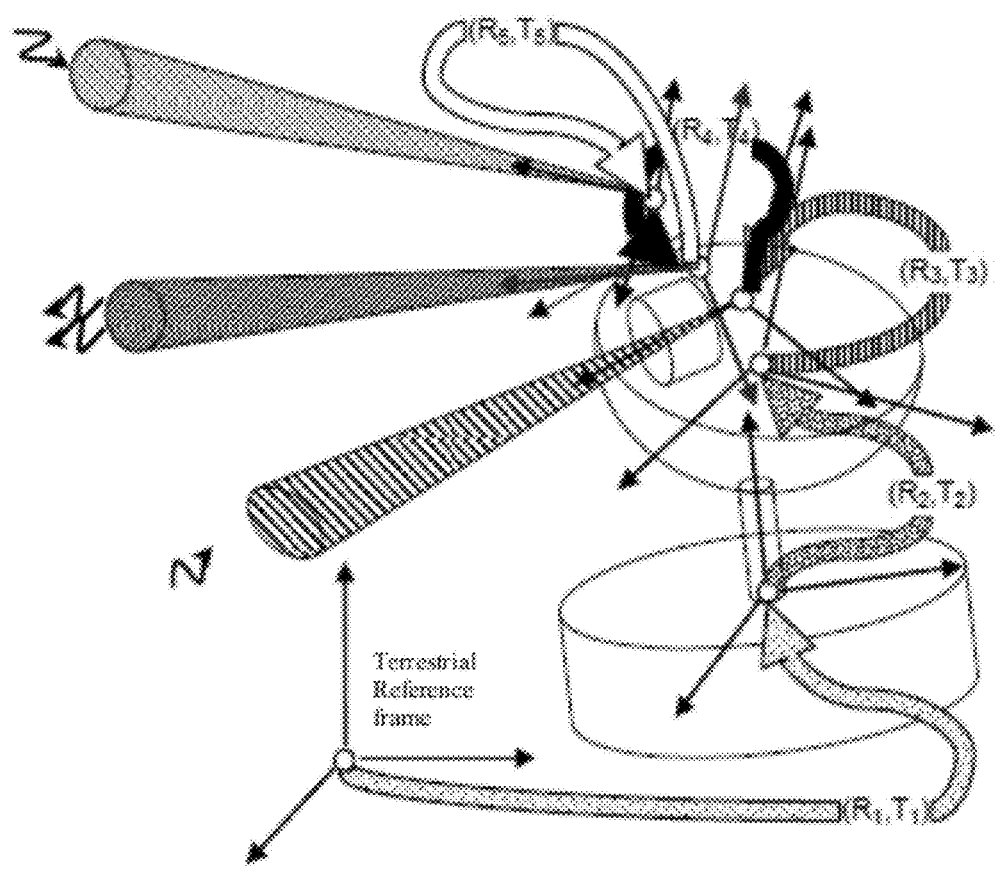
FIG. 6 shows diagrammatically the transformations for passing from one coordinate frame to the other, FIG. 7 present a diagram of the acquisition conditions allowing simultaneous passive location and calibration by using the motion and by proceeding either solely with passive measurements (FIG. 7a), or by adding active or distance measurements (FIG. 7b).

The physical modeling of the various gimbals of the system is conducted according to the analysis of the effects of the contributions induced by the errors of translations (gaps between axes) and of rotation (alignments of axes) as well as of the order of the residual errors that one seeks to determine. This analysis conditions the fineness of the modeling to be adopted for a piece of equipment and a given need. The feeding of the process of estimation, by the extraction of image features of several views corresponding to details of fixed elements in the scene, affords a significant number of measurements. This significant quantity makes it possible to envisage the estimation of a high number of calibration unknowns provided that the pairing quality, the distribution and the dilution (or geometry of the viewing conditions VC) of the features are sufficient and that the various transformations to be characterized are properly separable. FIG. 6 illustrates such a situation where the rotation "R" and the translation "T" are expressed as a function of the elementary transformations ($R_k$, $T_k$) between the successive coordinate frames as:

$$R = \prod_{k=1}^{K} R_k \quad \text{(equation 1)}$$

$$T = \sum_{k=1}^{K} \left( \prod_{n=1}^{K-1} R_n \right) T_k$$

When the transformations are known to first order, we seek linear solutions to this system in the form:

$$R_k = R_{1k} \cdot R_\epsilon$$

$$T_k = T_{1k} + T_\tau$$

where the elementary rotation matrix $R_\epsilon$ and the elementary translation $T_\tau$ are respectively denoted:

$$R_\epsilon = \begin{pmatrix} 0 & -\epsilon_Z & \epsilon_Y \\ \epsilon_Z & 0 & -\epsilon_X \\ -\epsilon_Y & \epsilon_X & 0 \end{pmatrix}$$

$$T_\tau = (\tau_X \quad \tau_Y \quad \tau_Z)^T$$

To estimate the elements of an elementary rotation that are placed at a certain rank in (equation 1), the terms situated on their "right" of the rotation in the equation are written in the form of a vector $U=(u1, u2, u3)^T$. Writing it this way makes it possible to simply obtain the sought-after elements of the rotation by transforming the product $R_\epsilon \cdot U$ into:

$$R_\epsilon U = \begin{pmatrix} 0 & u_3 & -u_2 \\ -u_3 & 0 & u_1 \\ u_2 & -u_1 & 0 \end{pmatrix} \begin{pmatrix} \epsilon_X \\ \epsilon_Y \\ \epsilon_Z \end{pmatrix}$$

Knowledge of the transformations can originate either from specifications, evaluations or ground calibration for example or on the basis of previous evaluations carried out with various operating conditions of the system.

The number of magnitudes to be estimated is conditioned by the type of hardware architecture of the instrument, which is used for the measurement of angles of attitude. This number quickly becomes significant with the increase in the number of mechanical gimbals to be compounded to get the absolute attitude of the line of sight or "LoS". The attitude calculation uses 3K angles for a mounting of the system involving relative measurements of attitude between K mechanical gimbals.

Thus it will not be sought to estimate the orientation contributions that are liable to occur at the level of each mechanical gimbal since there may rapidly be a large number of them. The chaining together of 2 pure rotations between 2 gimbals (or coordinate frames), for example, is strictly equivalent to a single rotation and the estimation of the global rotation does not make it possible to separate the information to allot one of them at the level of the contributions of each gimbal. In the case of a mounting or of a configuration where the attitude measurement bias may be considered to be added directly to that of the mounting, a scheme making it possible to directly evaluate the global orientation may be sufficient to globally characterize the defects of bias (mounting+measurements). The application of the global correction to one of the gimbals will fulfill the sought-after objective in favor of the location or pointing functions.

The attitude calculation may typically be reduced to a minimum of 3 elementary rotations for a measurement instrument, which estimates the absolute attitude of its LoS by means of an AHRS device, the acronym standing for the expression "Attitude Heading Reference System".

Hereafter, we consider a system for which the chaining together of these transformations amounts to a rotation "R" and translation "T" transformation which generally makes it possible to express the coordinates of a point in the final coordinate frame as a function of its coordinates in the initial coordinate frame as:

$$(OM)_N = R(OM)_1 + T$$

The description of the proposed process thus adopts a modeling of the biases of angle and of position by this transformation with 6 parameters, although it is possible to enter into the details of a more complex specific mechanization for a given system configuration.

The modeling of the picture-taking function for an image i of the optronic sensor situated at ($x_i$, $y_i$, $z_i$) makes it possible to write generally the location function allotting position coordinates (x, y, z) in a geographical coordinate frame associated with the scene to a point k with coordinates ($p_{ki}$, $g_{ki}$) in a coordinate frame of the image "i" in the form:

$$(x \quad y \quad z)^T = G(\Theta_i, p_{ki}, q_{ki})$$

$$\begin{pmatrix} x_i - x \\ y_i - y \\ z_i - z \end{pmatrix} = \mu_k R \begin{pmatrix} p_k - p_0 \\ q_k - q_0 \\ -f_0 \end{pmatrix}$$

In addition to the elements ($p_0$, $g_0$, $f_0$), the internal parameters model the principal effect of the distortion in the form of a radial deformation of the perfect pixel coordinates (p,q) by transforming them into (p',q') according to the following form:

$$p' = p_c + L(r)(p - p_c)$$

$$q' = q_{cx} + L(r)(q - q_c)$$

$$r = \sqrt{(p - p_c)^2 + (q - q_c)^2}$$

Figure 5:
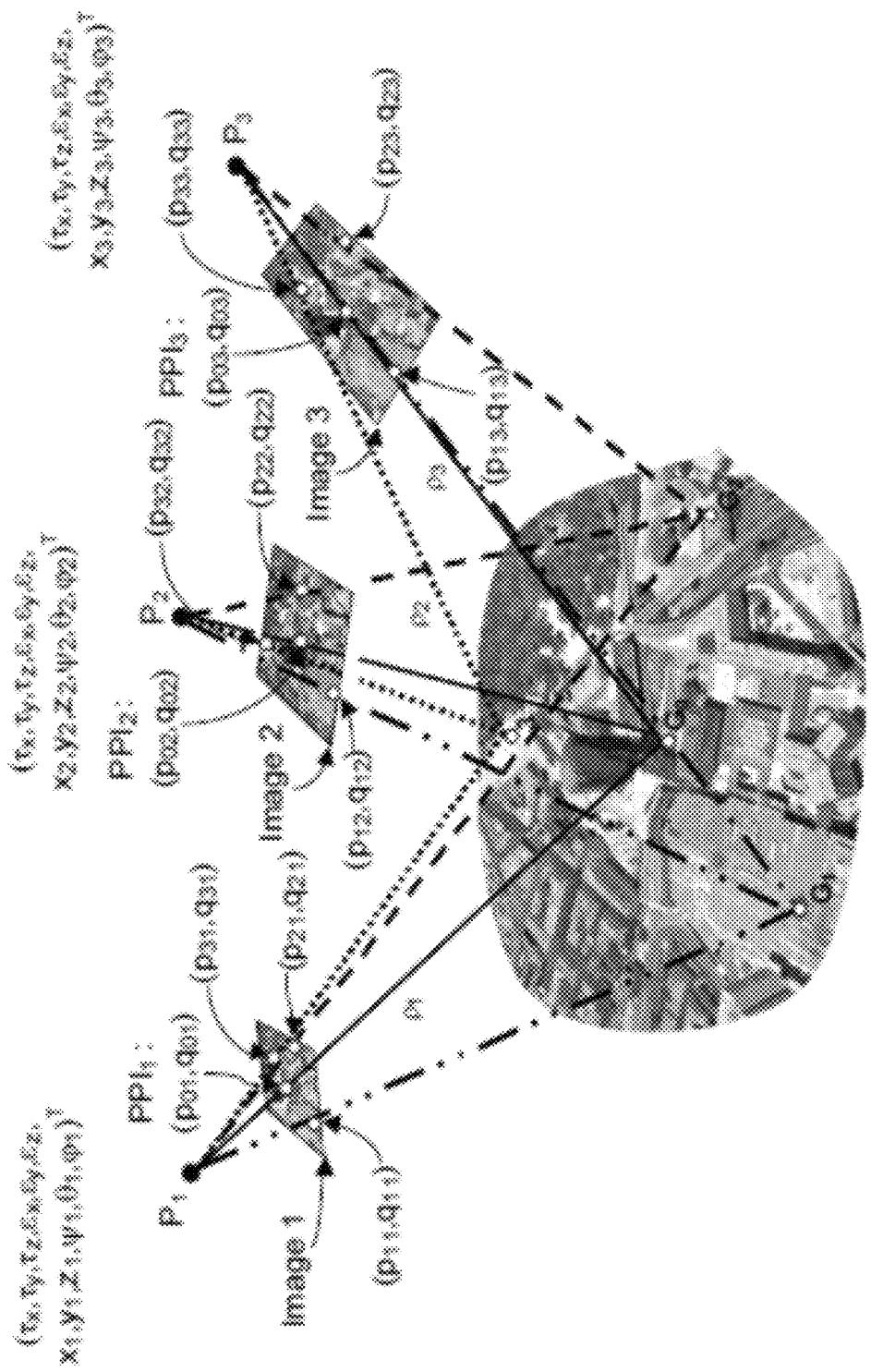
FIG. 5 represents a diagram of the measurements logged to feed the method according to the invention.

In this expression, $(p_{ki}, q_{ki})$ are the image coordinates of the point k in the image i, and (x, y, z) the coordinate of the corresponding point on the ground. The transpose of the vector u is denoted $u^T$—and the vector $\Theta$ contains at one and the same time (see FIG. 5):
- the internal picture-taking parameters (focal length, position of the Image Principal Point (PPI) on the detector, optical distortion),
- the external picture-taking parameters varying at each image "i": position of the $P_i$ of the sensor with coordinates $(x_i, y_i, z_i)$ and the attitude $(\psi_i, \theta_i, \phi_i)$ of the image in the scene coordinate frame,
- the calibration parameters $(\tau_x, \tau_y, \tau_z, \epsilon_x, \epsilon_y, \epsilon_z)$ common to the various images,
- optionally the distance between the PPI and the point of the scene corresponding to the image center if a telemeter harmonized with the optical axis is available.
- the pixel with coordinates $(p_c, q_c)$ corresponds to the center of the distortion also called the Principal Point of Symmetry (PPS).

It is noted that the internal parameters of the system are assumed not to vary from one image to the other during the measurements acquisition phase.

The proposed calibration process has following characteristics:
- automatic management makes it possible to select the sighted zone so as to decide on an effective implementation of the process according to:
  i. the analysis of the content of the scene based on the contrast of the imaged zone and on the characteristics of the features extracted by the image processing,
  ii. the performance level that has to be obtained so as to ensure required location or pointing performance based on a given configuration of trajectory (example for an aeronautical platform navigating under a flight plan or for a terrestrial platform following a transport network). In this approach, the observation zone is made to vary on a partition of the scene of the order of the imaged size and the performance of the calibration attainable is summarized by pointing at the center of this zone. The performance is obtained through the Fisher Information Matrix (FIM), the expression for which is described a little further on (equation 2), by sampling the trajectory at the rate of the measurements. The zone of best performance attainable by the sensor is thereafter retained for the acquisitions,
  iii. the need to propose a trajectory for the system or to evaluate the best achievable performance by means of an ideal estimation technique; accordingly, it is proposed to determine an optimal geometric configuration (according to a subsequent description of optimization based on the FIM).
- an image sequence,
- a mode of tracking with lock-on to a fixed point of the scene appearing as contrasted in the image,
- the search for contrasted features in the image "i", by extracting points of interest with coordinates $(p_{ki}, q_{ki}$ for $k=1 \ldots K_i)$, such as corners, blobs, . . . or by more robust descriptors based on the algorithms such as SIFT or SURF (derived respectively from the expressions Scale-Invariant Feature Transform and Speeded Up Robust Features),
- the Matching of the previous image features (MIF for Matched Images Feature) by utilizing the epipolar geometry of the images for the MIF between images taken from fairly distant positions or more conventional techniques for tracking in the image sequence. A pairing (or MIF), of features (denoted k and l) between the images (denoted i and j) gives rise to a link of features in the form of a pair $\{(p_{ki}, q_{ki}); (p_{lj}, q_{lj})\}$. Links in the form of a triplet or quadruplet of features can also be used when they are detected between 3 or 4 images for example,
- the estimation of the parameters which may consist in all or part:
  i. of the picture-taking and calibration parameters over the sequence.
  ii. of the coordinates of the points $G_m$ on the ground corresponding to the matched features.
  iii. of the parameters internal to the sensor (such as focal length, and distortion) insofar as the observations are sufficiently dense over the image and varied in terms of VC as to allow their estimation under correct conditions of observability.

The estimation of the parameters is conducted so as to minimize the set of the residuals on the ground coordinates of the matched features extracted from the sequence.

In practice, the minimum number of features to be used depends on the number of parameters to be estimated. Each pair of features gives a minimum of 2 observation equations and more if the object associated with the features is visible on more than 2 images. These pairs arise in general in significant number on account of the contrasted details contained in the scene and of the significant overlap between the images.

The process exhibits an advantage in regard to autonomy on account of its ability:
- to operate without using any landmark point,
- to lock on and automatically track the point sighted by virtue of the agility of the LoS and its coupling to the deviometry processing,
- to extract and to pair in a robust manner the features between the images,
- to telemeter automatically on the point corresponding to the image center.

The process also exhibits a performance advantage which rests upon the quality of the estimation consisting:
- in controlling the coherence of the optronic information through the local coherence of the detector and of the geometry of the picture shots taken,
- in using the telemeter, when the latter may be used, to link the position of the sensor to the scene on the basis of measurements of highly accurate date-stamps (the position of the sensor through the date-stamps of the GPS and the measurement of distance to the scene through the measurement of flight times).

In space, the LoS arising from a point $P_i$ does not cross the LoS arising from a point $P_j$ on account of the measurement errors. Hereinafter, the middle of the segment which minimizes the distance between the LoS arising from $P_i$ and the LoS arising from $P_j$ is called the point of intersection $G_{ij}$.

At least two points $G_{ij}$ are required in order to allow a first determination of these defects, i.e. at least 3 ensembles of two angle measurements or 2 ensembles of 3 measurements, one of which is a distance measurement. For these 2 configurations, we therefore have at least 6 measurements: $\{(\theta_1, \phi_1), (\theta_2, \phi_2), (\theta_3, \phi_3)\}$ in passive mode or $\{(\theta_1, \phi_1, \rho_1), (\theta_2, \phi_2, \rho_2)\}$ in active mode, where $\rho_i$ represents the measurement of distance between $G_0$ and the measurement instrument (typically a telemeter) considered at the position $P_i$. Of course, the more points $G_{ij}$ that are available and the greater their dispersion in space, the more precise the estimation of the error.

The presence of the telemeter is optional since the process is capable of operating on the basis of angular measurements alone. Its presence makes it possible to increase the information gathered and to improve performance.

It is possible conversely to have only distance measurements "$\rho$" obtained with a telemeter harmonized angularly with the axis of the LoS; an error $\Delta\rho$ in the measurement of the telemeter is then measured.

This configuration exhibits the advantage of operating with no component for inertial measurements, thus on the one hand reducing the hardware cost for the system and on the other hand reducing the constraints related to the characteristics of these measurements such as drift, integration constant, integration of noise, etc.

The use of a telemeter (alone or with inertial means) presupposes a harmonization of its axis with that of the image. In the converse case, the proposed procedure makes it possible to estimate the alignment of the laser axis with the image axis. The proposed field of application may be extended by considering that the distance measurements, which are deduced from a propagation time measurement, may be provided by instruments other than a telemeter, such as for example a radar or a sonar.

The measurements used in the method according to the invention may be either passive, or active, or both.

The measurements of angles are for example provided by inertial means such as an inertial rig, or a magnetic compass or else on the basis of quasi-fixed references such as landmarks in space (stars, planets, satellites) etc.: these are passive measurements. It is recalled that the proposed principle rests upon autonomy of the system in relation to the external data; it is thus considered:

- as acceptable to point the imager so as to acquire celestial bodies (stars, planets, satellites), and to pair them with onboard information capable of covering the entire theater of use of the sensor. In this case, the optronic sensor has a star sight function including the ability to detect the centers of the bodies (star camera function) and their identification (star tracker function).
- as constraining to carry onboard information of orthoimage type, arising from a mission preparation, which exhibits a resolution of the order of magnitude of that of the sensor with a spatial coverage corresponding to all the zones over which the sensor is able to operate. The constraints pertain here to the standpoint of the data to be deployed, of the operations of robust pairing to be carried out and of the volume of the information and operations to be processed.

Depending on the use made of the observation equations, it is possible:

- either to estimate solely the measurement defects, and one speaks of "Calibration Through Motion" or "Registration From Motion" (RFM),
- or to simultaneously estimate the measurement defects and the position of the point sighted (by compensating the measurement errors via the estimated defects), and one speaks of "calibration and location through motion" or "Localization and Registration From Motion" (LRFM).

These two variants may be carried out on the basis of Passive measurements (PRFM/PLRFM), or Active measurements (ARFM/ALRFM). The so-called active variants can also use passive measurements. Thus, we designate by PLRFM (for Passive Localization and Registration From Motion) an application using passive measurements to estimate the calibration parameters through the motion of the sensor (see FIG. 7b). In the case where a distance measurement is added, the application is designated by ALRFM (for Active LRFM) (see FIG. 7a).

Examples of uses of the observation equations will now be given for various applications.

Application (1): ARFM for the instrument calibration of a terrestrial sensor with in particular:
  i. the angular bias corresponding to the ignorance of the mounting and of the declination used by a magnetic compass and the distance bias of the telemeter,
  ii. the scale factors on the angle and distance measurement.

Application (2): ALRFM for the calibration of a direction while airborne with the calculation of bias in the angular direction and the distance measurement of the telemeter.

Application (3): Location and calibration on the basis of measurements of positions and of distances alone.

Application (4): calibration and georeferencing of images by aero-lateration.

Two other aspects of implementation of the process are thereafter presented aimed at:
- the automation of its operation and the optimization of the conditions of information gathering,
- the consideration of the variability of the estimated parameters according to the (thermomechanical) operating conditions.

Application (1): Calibration of Instruments on a Terrestrial Sensor

For terrestrial applications, optronic systems generally offer location of the sighted object of the scene, placed at the center of the image. This is carried out on the basis of a camera comprising a GPS receiver for determining the position of the sensor, a telemeter for measuring the distance to the object and an LoS orientation measurement means. Orientation measurement traditionally relies on a magnetic compass (DMC, the acronym standing for the expression "Digital Magnetic Compass"). The obtaining of a geographical position of good performance constitutes a genuine challenge since the DMCs, which are used because of their low cost and small bulk, exhibit the following drawbacks:

- the intrinsic performance of the measurement is moderate (the precision is of the order of 0.5°)
- the accuracy of alignment of axis of the DMC and of the image is limited so as to maintain manufacturing complexity consistent with the volume of the run and the cost of the equipment.
- The orientation measurement is carried out with reference to the geomagnetic meridian, which locally exhibits a deviation of orientation (declination) with regard to geographical North. This declination value may be obtained according to information of geographical maps or geomagnetic models (such as the IGRF for International Geomagnetic Reference Field or the WMM for World Magnetic Model). These models rely on the series expansion of the potential of the geomagnetic field in the form of a product of coefficients and of basis functions using spherical harmonics. They allow the calculation of the amplitude as well as direction of the local magnetic field on the basis of the coefficients tabulated in published reference versions. Every 5 years, the IGRF thus becomes the DGRF (with "D" for Definitive GRF) with data available over the period 1900-2010. Whichever magnetic field model is used, the orientation of the field must be on the one hand extrapolated with regard to the current date of the measurement and on the other hand remains able to vary locally with a shorter spatial frequency than that corresponding to the resolution of the models. The deviation between the value obtained by the model and that actually realized at the level of the measurement site is manifested essentially by a systematic error or angular bias.

For these various reasons, the proposed procedure exhibits particular interest since it makes it possible to obtain in a simple and analytical manner the biases of angular and distance measurement. Accordingly, it uses:

- a displacement over the terrain around a fixed object,
- a minimum of 2 ensembles of measurements on the object, one ensemble comprising the position of the sensor, its distance from the object, its azimuth.

In the presence of a defect of bias type in regard to the angle and distance measurements, a point with position $(x_0, y_0)$ may be directly located from a position $(x_k, y_k)$, according to ideal measurements:

$$x_0 = x_k + \rho_k \cos \theta_k$$

$$y_0 = y_k + \rho_k \sin \theta_k$$

In the presence of bias in the measurements of angle and distance:

$$\theta_{kb} = \theta_k + \Delta_\theta$$

$$\rho_{kb} = \rho_k + \Delta_\rho$$

the point situated at the (true) position with coordinates $(x_0, y_0)$ and obtained at the position $(x_b, y_b)$ given by:

$$x_b = x_k + \rho_{kb} \cos \theta_{kb} = x_k + (\rho_k + \Delta_\rho)\cos(\theta_k + \Delta_\theta)$$

$$y_b = y_k + \rho_{kb} \sin \theta_{kb} = y_k + (\rho_k + \Delta_\rho)\sin(\theta_k + \Delta_\theta)$$

is, on neglecting the second-order terms:

$$x_b \approx x_k + \rho_k \cos \theta_k - \Delta_\theta \rho_k \sin \theta_k + \Delta_\rho \cos \theta_k + O(\Delta^2) = x_0 - \Delta_\theta \rho_k \sin \theta_k + \Delta_\rho \cos \theta_k + O(\Delta^2)$$

$$y_b \approx y_k + \rho_k \sin \theta_k + \Delta_\theta \rho_k \cos \theta_k \Delta_\rho \sin \theta_k + O(\Delta^2) = y_0 + \Delta_\theta \rho_k \cos \theta_k + \Delta_\rho \sin \theta_k + O(\Delta^2)$$

In the following matrix form, the above expression shows that the displacement corresponds, to first order, to a rotation of the bias vector with component $(\Delta_\rho, \rho_k \Delta_\theta)^T$:

$$\begin{pmatrix} x_b \\ y_b \end{pmatrix} = \begin{pmatrix} x_0 \\ y_0 \end{pmatrix} + \begin{pmatrix} \cos\theta_k & -\sin\theta_k \\ \sin\theta_k & \cos\theta_k \end{pmatrix} \begin{pmatrix} \Delta_\rho \\ \rho_k \Delta_\theta \end{pmatrix} + \begin{pmatrix} 1 \\ 1 \end{pmatrix} O(b^2)$$

Figure 4:
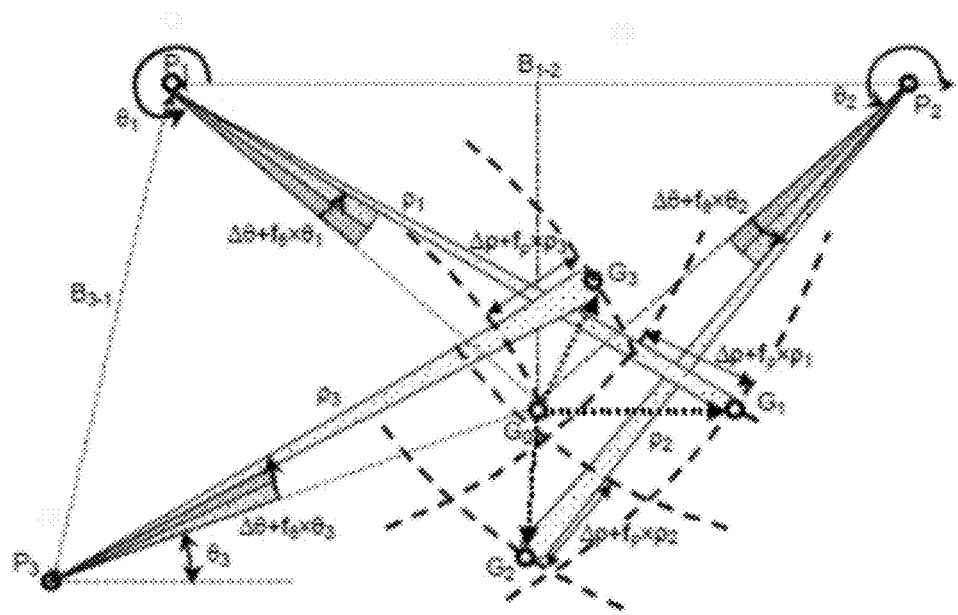

This expression simply conveys the contribution of the two biases to a positioning (FIG. 4).
A single measurement obviously does not make it possible to determine at one and the same time the position of the point and the angle bias and distance bias. On the other hand two measurements on the same point are sufficient, by differencing, to determine the biases in the following manner:

$$\begin{pmatrix} -\rho_k \sin\theta_k + \rho_j \sin\theta_j & \cos\theta_k - \cos\theta_j \\ \rho_k \cos\theta_k - \rho_j \cos\theta_j & \sin\theta_k - \sin\theta_j \end{pmatrix} \begin{pmatrix} \Delta_\theta \\ \Delta_\rho \end{pmatrix} =$$

$$\begin{pmatrix} x_j + \rho_j \cos\theta_j - x_k - \rho_k \cos\theta_k \\ y_j + \rho_j \sin\theta_j - y_k - \rho_k \sin\theta_k \end{pmatrix} + \begin{pmatrix} 1 \\ 1 \end{pmatrix} \varepsilon_{jk}$$

For a measurement pair (j, k), the expressions for the biases may be obtained in an analytical manner. The determinant of the system equals:

$$\delta = (\rho_k + \rho_j)[\cos(\theta_k - \theta_j) - 1] = -2(\rho_j + \rho_i)\sin^2\left(\frac{\theta_k - \theta_j}{2}\right)$$

and the expressions for the biases of angle and distance are obtained, under the observability conditions ($\delta$ non-zero), according to:

$$\Delta_\theta \times \delta = (x_j - x_k)(\sin\theta_k - \sin\theta_j) - (y_j - y_k)(\cos\theta_k - \cos\theta_j) + (\rho_j - \rho_k)\sin(\theta_k - \theta_j)$$

for the distance bias and for the angular bias by:

$$\Delta_d \times \delta = (x_j - x_k)(\rho_j \cos\theta_j - \rho_k \cos\theta_k) + (y_j - y_k)(\rho_j \sin\theta_j - \rho_k \sin\theta_k) - 2\rho_j \rho_k \cos(\theta_k - \theta_j) + \rho_j^2 + \rho_k^2$$

The above system has a physical solution when its discriminant $\delta$ is different from zero; it is moreover noted that the latter:
- approaches zero when $\theta_k \approx \theta_j$. Stated otherwise a small displacement of the sensor between two measurements corresponding to a poor configuration,
- is extremal (of value −2) when $\theta_k \approx \theta_j + \pi$ on the one hand and that on the other hand the distances to the points are large. This corresponds to sightings of opposite directions at a large distance from the point.

Thus, the conditions in which calibration is optimal are opposite from the conditions for which location is ideal. To be effective, calibration requires a sensitivity to error which accordingly must be large whereas location needs to be insensitive thereto.

To improve performance in the presence of angular measurement error it is necessary:
- on the one hand to avoid locating a point on the basis of sightings of opposite directions, and,
- on the other hand, to try to approach thereto so as to decrease the sensitivity to angular errors.

This duality between location and calibration is not limited to performance nor specific to this application.

In the presence of bias and scale factor type defects, in the angle and distance measurements, the measurements are written thus:

$$\theta_{kbf} = (1 + f_\theta)\theta_k + \Delta_\theta$$

$$\rho_{kbf} = (1 + f_\rho)\rho_k + \Delta_\rho$$

$$x_{bf} = x_k + \rho_{kbf} \cos\theta_{kbf} = x_k + ([1 + f_\rho]\rho_k + \Delta_\rho)\cos([1 + f_\theta]\theta_k + \Delta_\theta)$$

$$y_{bf} = y_k + \rho_{kbf} \sin\theta_{kbf} = y_k + ([1 + f_\rho]\rho_k + \Delta_\rho)\sin([1 + f_\theta]\theta_k + \Delta_\theta)$$

i.e. an expression for the location to first order of the form:

$$x_{bf} \approx x_b - f_\theta \theta_k \rho_k \sin\theta_k + f_\rho \rho_k \cos\theta_k$$

$$y_{bf} \approx y_b + f_\theta \theta_k \rho_k \cos\theta_k + f_\rho \rho_k \sin\theta_k$$

$$\begin{pmatrix} -\rho_k \sin\theta_k + \rho_j \sin\theta_j & \cos\theta_k - \cos\theta_j & -\theta_k \rho_k \sin\theta_k + \theta_j \rho_j \sin\theta_j & \rho_k \cos\theta_k - \rho_j \cos\theta_j \\ \rho_k \cos\theta_k - \rho_j \cos\theta_j & \sin\theta_k - \sin\theta_j & \theta_k \rho_k \cos\theta_k - \theta_j \rho_j \cos\theta_j & \rho_k \sin\theta_k - \rho_j \sin\theta_j \end{pmatrix} \begin{pmatrix} \Delta_\theta \\ \Delta_\rho \\ f_\theta \\ f_\rho \end{pmatrix} =$$

$$\begin{pmatrix} x_j + \rho_j\cos\theta_j - x_k - \rho_k\cos\theta_k \\ y_j + \rho_j\sin\theta_j - y_k - \rho_k\sin\theta_k \end{pmatrix} + \begin{pmatrix} 1 \\ 1 \end{pmatrix}\varepsilon_{jk}$$

To first order, the estimate may be written as a function of the measurement:

$$\theta_k = \frac{\theta_{kbf} - \Delta_\theta}{1+f_\theta} \approx (1-f_\theta)\theta_{kbf} - \Delta_\theta$$

$$\rho_k = \frac{\rho_{kbf} - \Delta_\rho}{1+f_\rho} \approx (1-f_\rho)\rho_{kbf} - \Delta_\rho$$

Note that in 3D, this 1D situation is approached in the cases:
of long-range lateral sighting of the object and small height from the ground,
of vertical sighting while advancing on the point of interest.

This approach is simply generalized in 3D, with analytical expressions that are longer to be expanded. In N=2 or 3 (N being the number of dimensions), two ensembles of measurements make it possible to write 2×N relations and by differences, N relations make it possible to determine the N biases in each type of measurement ($\Delta\rho$, $\Delta\theta$) in 2D, supplemented with $\Delta\phi$ in 3D.

The correction values for the biased measurements are thereafter obtained by adding the opposite of the biases obtained to the values of the biased measurements. Thus, the position of the point G(x,y) sighted is obtained according to:

$$x = x_k + (\rho_m - \Delta\rho)\cos(\theta_m - \Delta\theta)$$

$$y = y_k + (\rho_m - \Delta\rho)\sin(\theta_m - \Delta\theta)$$

In the presence of biases alone, for example for the two pairs of configurations of the following table, corresponding to an object $G_0$ situated at [0,0], with the presence of a bias of −1° in the measurement DMC and of 5 m in the distance measurement, we obtain an estimation of bias:
in the distance to within better than 1 m,
in the azimuth to within 5 μrad.

| $P_k$ [$x_k$, $y_k$] (m, m) | Distance $\rho_k$ (m) | Angle $\theta_k$ (°) |
|---|---|---|
| [−5000, 2500] | 5590.2 | −26.6 |
| [2500, 2500] | 3535.5 | −135 |

Application (2): Location and Calibration on the Basis of Angular and Distance Measurements while Airborne (AL-RFM).

For aero-terrestrial applications, a system is considered which comprises a sensor in motion operating with a tracking mode pursuing an object of the scene. In this situation, along the whole of a trajectory the system makes numerous measurements composed of positions of the sensor, of angular measurements of the LoS of the sensor and of distances from the sensor to the object of the scene.

Let us consider an ALRFM application seeking to estimate 2 angular biases ($\Delta\psi$, $\Delta\theta$) and a distance bias ($\Delta\rho$) with a sensor tracking a point on the ground with unknown coordinates (x0, y0, z0) and its PRFM counterpart when the distance measurement ρ is not available.

The way the observation equations are written makes it possible to write when simultaneously seeking the measurement biases and the position of the locked-on point on the ground (ALRFM) for example:

$$\begin{pmatrix} 1 & 0 & 0 & \cos\psi_k\cos\theta_k & -\rho_k\sin\psi_k\cos\theta_k & -\rho_k\cos\psi_k\sin\theta_k \\ 0 & 1 & 0 & \sin\psi_k\cos\theta_k & \rho_k\cos\psi_k\cos\theta_k & -\rho_k\sin\psi_k\sin\theta_k \\ 0 & 0 & 1 & \sin\theta_k & 0 & \rho_k\cos\theta_k \end{pmatrix} \begin{pmatrix} x_0 \\ y_0 \\ y_0 \\ \Delta_\rho \\ \Delta_\psi \\ \Delta_\theta \end{pmatrix} =$$

$$\begin{pmatrix} x_k \\ y_k \\ z_k \end{pmatrix} + \rho_k \begin{pmatrix} \cos\psi_k\cos\theta_k \\ \sin\psi_k\cos\theta_k \\ \rho_k\sin\theta_k \end{pmatrix} + v_k$$

If it is desired to carry out calibration only, the coordinates of the ground point may be deleted from the observation equations so as to reduce to the situations of PRFM and ARFM only calibration.

Figure 7A:
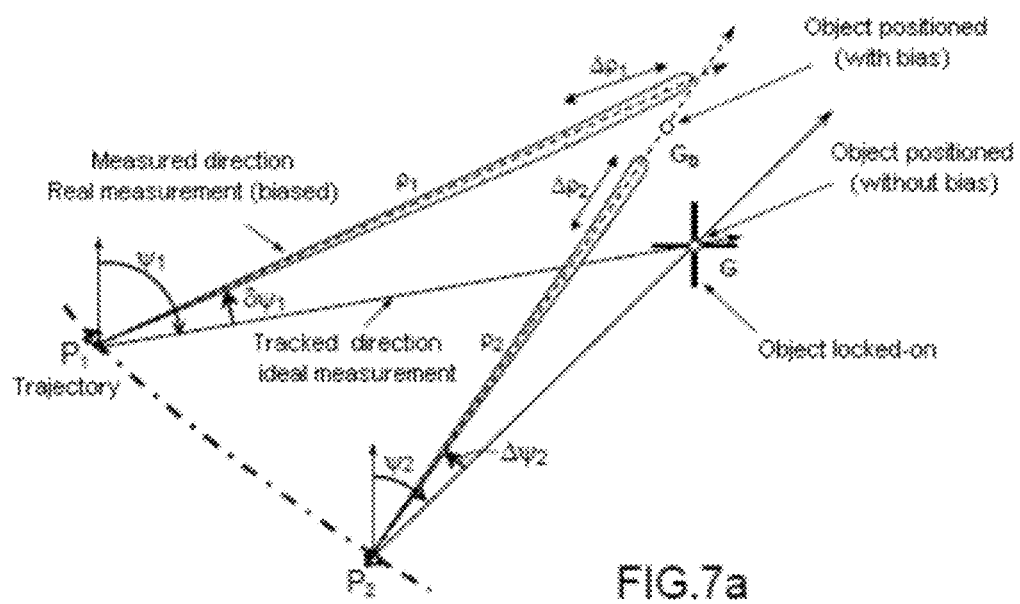
Figure 7B:
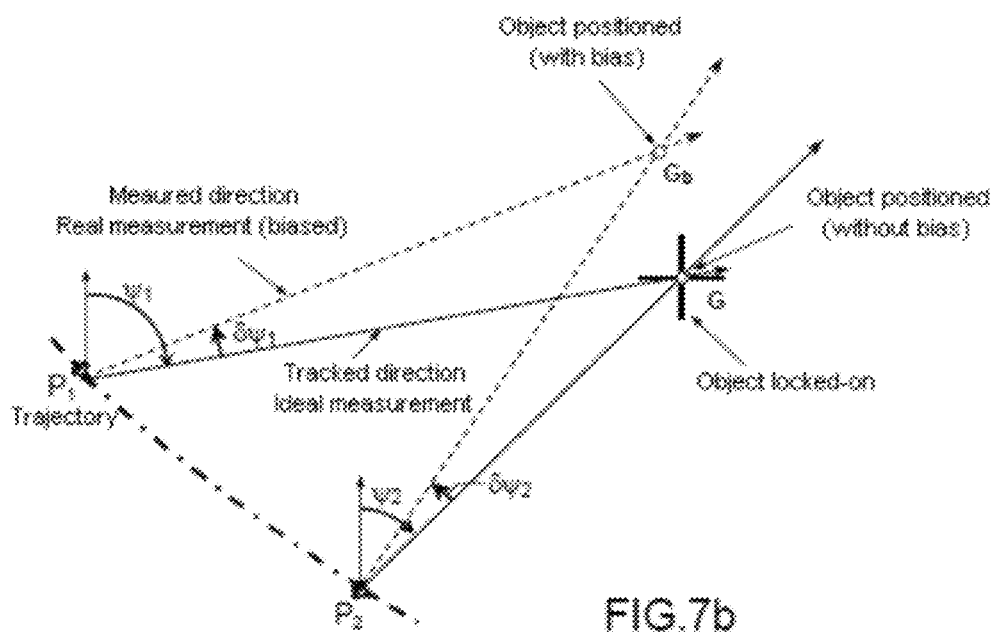

With 2 ensembles of measurements ($x_k$, $y_k$, $z_k$, $\psi_k$, $\theta_k$, $\rho_k$), as in FIG. 7a, we have 6 equations which make it possible to explicitly determine the position of the object and the measurement biases. With a greater number of measurement ensembles, the above system is simply solved, on account of its linearity, by least squares or by filtering.

Application (3): Location and Calibration on the Basis of Positions and Distances To calibrate measurement defects and have bias information of good accuracy, the overview of the system errors indicates that it is relevant to establish a location of the object without using the angular measurements. In this application, we propose simultaneous estimation:
of the position of the object solely on the basis of the sensor position measurements and of the distance measurements,
of the defects of distance measurement (bias and scale factor).

If desired, the knowledge of the estimated position of the object (on the basis of the measurements corrected of their defect) allows angular defects to be corrected a posteriori.

In the case of several distance measurements $\rho_k$, carried out at positions $P_k(x_k, y_k, z_k)$, the defects in bias and in scale factor may be estimated by keeping the sensor pointed at one and the same object along the trajectory.

Thus, for a set of active measurements, exhibiting an error of bias $b_\rho$, of scale factor $s_\rho$ and measurement noise $v_\rho$, we seek to minimize the set of the following quantities:

$$\delta_n = \sqrt{(x-x_n)^2 + (y-y_n)^2 + (z-z_n)^2} - \rho_n - s_\rho\rho_n - b_\rho - v_\rho$$

where (x, y, z) are the terrain coordinates of the point followed and ($x_n$, $y_n$, $z_n$) are the positions of the sensor for which a measurement of the distance "$d_n$" separating the sensor from the object is available. The defects of the telemeter ($s_\rho$, $b_\rho$, $v_\rho$) characterize respectively its scale factor, its bias and the measurement noise.

In the LRFM approach, both the position of the object sighted and the measurement defects are sought. The state vector consisting of the parameters to be estimated may be written:

$$\Theta = [xyzb_\rho s_\rho]^T$$

$u^T$ representing the transpose of the vector u.

In the RFM approach, the vector of parameters is reduced to the last 2 components of the above vector.

In practice, a first approximate position of the object $\Theta_0$ can be obtained by using all or some of the measurements assumed to be defect-free. The following state vector is then obtained:

$$\Theta_0 = [x_0 y_0 z_0 0 0]^T$$

The state vector of the system with the N measurements can then be obtained by a conventional iterative approach in the form:

$$\Theta_k = \Theta_{k-1} + \Delta\Theta_k$$

where:

$$\Delta\Theta_k = -(H^T R^{-1} H)^{-1} H^T \Sigma^{-1} \delta(\Theta_{k-1})$$

with for N distance measurements an observation matrix H and the increment in the vector of calibration components $\delta\Theta$:

$$H = \nabla_\Theta \delta = \begin{pmatrix} \frac{x-x_1}{\rho_1} & \frac{y-y_1}{\rho_1} & \frac{z-z_1}{\rho_1} & -1 & -\rho_1 \\ \vdots & \vdots & \vdots & \vdots & \vdots \\ \frac{x-x_N}{\rho_N} & \frac{y-y_N}{\rho_N} & \frac{z-z_N}{\rho_N} & -1 & -\rho_N \end{pmatrix}$$

$$\delta(\Theta_{k-1}) = \begin{bmatrix} \delta_1(\Theta_{k-1}) \\ \vdots \\ \delta_N(\Theta_{k-1}) \end{bmatrix}$$

The matrix $\Sigma$ represents the covariance of the measurement noise; it reduces to the product of the identity matrix times $\sigma_\rho^2$ when the measurements all have the same noise $\sigma_\rho$ and when the noise values are mutually independent.

The application to particular trajectories demonstrates the ability of the scheme to simultaneously estimate the position of the object and the measurement defects. To correctly estimate both the bias and the scale factor on the distance, the configurations for which the distance to the object does not remain constant are preferably chosen. Indeed, in the situation where the distance to the object varies, the error contribution related to the scale factor does not behave as a bias and it is then possible to distinguish the two physical origins of the defects.

Application (4): Calibration and Location by Aero-Lateration

Among the applications presented, this application represents the most general derivative in the sense that it makes it possible to correct in 3D the georeferencing of the image by estimating the calibration parameters while allowing for the following:

that the angular biases to be estimated exist in the three directions in space,
that active measurements may or may not be used,
that a digital terrain model or a ground assumption is available on the scene,
that the parameters to be estimated comprise contributions relating to the internal parameters of the sensor,
that the parameters to be estimated do or do not comprise the simultaneous location of object of the scene.

This method may be extended to other fixed objects $G_1$, $G_2$, ..., in addition to $G_0$. These other fixed objects must of course be visible on the images or at least on some of them. They are preferably well distributed around $G_0$ so as to have a more favorable estimation configuration. In this case the method comprises an additional step of matching one image with the other of these other objects, as a function of the internal characteristics of the images. The latter depend on the internal characteristics of the sensor which are assumed to be known; this entails:

for the detector: the resolution of the detector, the number of rows and columns of the photosensitive matrix, and
for the optics: the focal length, the coordinates of the image principal point and the distortion.

Utilizing several fixed points $G_1$, $G_2$, ... on several images makes it possible to estimate the measurement defects in the three degrees of angular freedom: $\Delta\psi$, $\Delta\theta$ and $\Delta\phi$. The tracking and the distance measurements, if any, are carried out on the fixed point $G_0$ at the center of the images, and at least one other visible fixed point on the ground of the sequence of images must be followed. In practice, several objects of the scene giving rise to points of interest are followed simultaneously, thereby limiting the loss of observation when objects come to leave the instantaneous field of vision of the sensor, so improving the estimation result and the probability of having points better distributed over the whole image.

The calibration parameters are obtained by minimizing the following expression:

$$\Theta_R = \min \chi^2$$

$$\chi^2 = v^2(\Theta_R) + v^2(\Theta_{li}) + \sum_{i=1}^{I} \left[ v^2(\Theta_{Ei}) + v^2(\rho_{0i}) + v^2(A_i) + \sum_{k=1}^{K} v^2(P_{ik}) \right]$$

where the quantities respectively represent the residuals in: the calibration parameters, the picture-taking external parameters, the internal (or intrinsic) parameters of the sensor, the distance at image center, the coordinates, if any, the ground coordinates of points corresponding to the features, the features. By expressing this in more detail:

$$v^2(\Theta_R) = \delta_{\Theta_R}^T \sum\nolimits_{\Theta_R}^{-1} \delta_{\Theta_R}$$

$$\delta_{\Theta_R} = (\tau_x - \tau_x^* \quad \tau_y - \tau_y^* \quad \tau_z - \tau_z^* \quad \varepsilon_x - \varepsilon_x^* \quad \varepsilon_y - \varepsilon_y^* \quad \varepsilon_z - \varepsilon_z^*)^T$$

$$v^2(\Theta_{li}) = \delta_{li}^T \sum\nolimits_{li}^{-1} \delta_{li}$$

$$\delta_{li} = (p_0 - p_0^* \quad q_0 - q_0^* \quad f_0 - f_0^* \quad p_c - p_c^* \quad q_c - q_c^* \quad K_1 - K_1^*)^T$$

$$v^2(\Theta_{Ei}) = \delta_{Ei}^T \sum\nolimits_{Ei}^{-1} \delta_{Ei}$$

$$\delta_{Ei} = (x_i - x_i^* \quad y_i - y_i^* \quad z_i - z_i^* \quad \psi_i - \psi_i^* \quad \theta_i - \theta_i^* \quad \varphi_i - \varphi_i^*)^T$$

$$v(\rho_{0i}) = \delta_{\rho_{0i}}^T \sum\nolimits_{\rho_{0i}}^{-1} \delta_{\rho_{0i}}$$

$$\delta_{\rho_{0i}} = \rho_{0i} - \rho_{0i}^*$$

$$\Lambda_{\rho_{0i}} = E[d_{ki} d_{ki}^T] = \sigma_\rho^2$$

$$\rho_{0i} = \sqrt{(x_{G0} - x_{ki})^2 + (y_{G0} - y_{ki})^2 + (z_{G0} - z_{ki})^2}$$

$$v^2(A_i) = (x_i - x_G \quad y_i - y_G \quad z_i - z_G) \sum\nolimits_{A}^{-1} (x_i - x_G \quad y_i - y_G \quad z_i - z_G)^T$$

$$v^2(P_{ik}) = \delta_{Pik}^T \sum\nolimits_{Pik}^{-1} \delta_{Pik}$$

$$\delta_{Pik} = [(x_{Gk} \quad y_{Gk} \quad z_{Gk}) - G(\Theta_i, p_{ik}, q_{ik})]^T$$

$$\sum\nolimits_{Pik} = \begin{pmatrix} \sigma_{pik}^2 & \sigma_{pq} \\ \sigma_{pq} & \sigma_{qik}^2 \end{pmatrix}$$

The quantities $\Sigma$ and $\sigma$ represent the a priori covariances in the parameters.

The scheme for minimizing the criterion relies on a conventional technique:
- either of Newton type by processing the observations batch-wise, starting from an initial solution, using the measurements logged for the picture-taking parameters, the approximate knowledge of the internal parameters of the sensor (if they have to be estimated), and the fact that the values of the calibration parameters are small i.e. $\Theta_R=(0,0,0,0,0,0)^T$ and then by proceeding by iteration after linearization to minimize the criterion. Each step provides an estimation of the differences $d\Theta_R$, $d\Theta_{Ei}$, ... which makes it possible to resume the estimation from the initial step
- or of Kalman type by processing the measurements on the fly, that is to say by estimating the parameter vector in tandem with the production of the matches between the images of the sequence
- or by relaxation by estimating in a step No 1 the picture-taking parameters, $\Theta_{Ei1}$, $\Theta_{R1,1}$ being assumed zero (no bias); and then in a step No 2 by estimating $\Theta_{R1,2}$ on the basis of the external parameters obtained in step 1. The estimation process thereafter resumes from step No 1 with the value $\Theta_{Rn-1,2}$ of the calibration parameters to obtain an ensemble of picture-taking parameters $\Theta_{Ein}$, making it possible to estimate $\Theta_{Rn,2}$; and so on, up to convergence.

Implementation of the Process and Optimization of Performance

To improve the performance in the estimations of the calibration and/or to provide support to the automatic management of the measurement instrument and/or to the platform navigation function, it is proposed:
1) starting from a given trajectory (under flight plan), to seek the ideal zone at which to point the sensor in order to carry out the calibration,
2) starting from the position of an object on which the sensor must carry out its calibration, to propose a trajectory making it possible to approach the ideal estimation performance.

In detail, it is sought to improve the performance in the parameters estimated during calibration:
1) by adapting the trajectory for a sighted point. Accordingly, future positions $P_1, P_2, \ldots$ which will optimize the estimation performance are calculated starting from an initial position $P_0$ and from a speed $V_0$. To carry out this optimization, use is made of for example the Fisher information (FIM Fisher Information Matrix) which quantifies the information relating to the measurement ensembles with a view to the best possible estimation of the bias. The interest therein lies in its character of additivity, which makes it possible to aggregate the information afforded by the trajectory up to the point $P_n$ with the various possibilities which may be envisaged at the time $T_{n+1}$. Starting from the measurement information and the approximate knowledge of the position of an object on which to calibrate, the aim of optimizing the trajectory is to achieve better calibration performance than that which would be obtained by following for example a pre-established flight plan. Starting from an initial speed, it is proposed to call into question the speed vector envisaged for the platform. This is carried out on one step, in terms of spatial distance and heading, with an amplitude compatible with the kinematic constraints of the platform (according to admissible acceleration). Starting from a current node, a set of nodes is then obtained, with the one retained corresponding to the maximum value of a criterion of the FIM (based on the trace or determinant or combination of the eigenvalues). It is proposed to deal with each step in terms of azimuth and then elevation.
2) by acting on the choice of the object $G_0$ to be sighted. For a predefined trajectory (case of a platform under flight plan); the agileness of the LoS of the measurement instrument is used in such a way as to point at a zone in space which will produce Fisher information of greatest worth for the fixed characteristics of the trajectory and of the measurement (rate, geometry and precision). Accordingly, a sampling is carried out of the zone of the scene attainable to carry out the calibration according to a spatial grid whose nodes bear the Fisher information calculations. The object is thereafter chosen in the zone corresponding to the node where the information is of greatest worth. The decision to actually work on this zone can thereafter be conditioned on the number, on the distribution and on the contrast of the objects of interest detected by the sensor when it is pointing at this zone.

For information corresponding to the measurements of the instant k, the Fisher information matrices, mentioned hereinabove, take the following forms:

$$FIM(k) = J_k^T \Lambda_k^{-1} J_k \quad \text{(equation 2)}$$

where the matrices $J$ and $\Lambda$ representing the Jacobians and Covariances of measurements may be written for the ALRFM and PLRFM calibration as:

$$J_{ALRFM}(k) = \begin{bmatrix} \frac{\partial \Delta_\rho}{\partial x_0} & \frac{\partial \Delta_\psi}{\partial x_0} & \frac{\partial \Delta_\theta}{\partial x_0} \\ \frac{\partial \Delta_\rho}{\partial y_0} & \frac{\partial \Delta_\psi}{\partial y_0} & \frac{\partial \Delta_\theta}{\partial y_0} \\ \frac{\partial \Delta_\rho}{\partial z_0} & \frac{\partial \Delta_\psi}{\partial z_0} & \frac{\partial \Delta_\theta}{\partial z_0} \\ \frac{\partial \Delta_\rho}{\partial \Delta_\rho} & \frac{\partial \Delta_\psi}{\partial \Delta_\rho} & \frac{\partial \Delta_\theta}{\partial \Delta_\rho} \\ \frac{\partial \Delta_\rho}{\partial \Delta_\psi} & \frac{\partial \Delta_\psi}{\partial \Delta_\psi} & \frac{\partial \Delta_\theta}{\partial \Delta_\psi} \\ \frac{\partial \Delta_\rho}{\partial \Delta_\theta} & \frac{\partial \Delta_\psi}{\partial \Delta_\theta} & \frac{\partial \Delta_\theta}{\partial \Delta_\theta} \end{bmatrix} = \begin{bmatrix} -\frac{dx_k}{\rho_k} & \frac{dy_k}{r_k^2} & \frac{dx_k}{r_k}\frac{dz_k}{\rho_k^2} \\ -\frac{dy_k}{\rho_k} & -\frac{dx_k}{r_k^2} & \frac{dy_k}{r_k}\frac{dz_k}{\rho_k^2} \\ -\frac{dz_k}{\rho_k} & 0 & -\frac{r_k}{\rho_k^2} \\ 1 & 0 & 0 \\ 0 & 1 & 0 \\ 0 & 0 & 1 \end{bmatrix}$$

$$J_{PLRFM}(k) = \begin{bmatrix} \frac{\partial \Delta_\psi}{\partial x_0} & \frac{\partial \Delta_\theta}{\partial x_0} \\ \frac{\partial \Delta_\psi}{\partial y_0} & \frac{\partial \Delta_\theta}{\partial y_0} \\ \frac{\partial \Delta_\psi}{\partial z_0} & \frac{\partial \Delta_\theta}{\partial \Delta_0} \\ \frac{\partial \Delta_\psi}{\partial \Delta_\psi} & \frac{\partial \Delta_\theta}{\partial \Delta_\psi} \\ \frac{\partial \Delta_\psi}{\partial \Delta_\theta} & \frac{\partial \Delta_\theta}{\partial \Delta_\theta} \end{bmatrix}_k = \begin{bmatrix} \frac{dy_k}{r_k^2} & \frac{dx_k}{r_k}\frac{dz_k}{\rho_k^2} \\ -\frac{dx_k}{r_k^2} & \frac{dy_k}{r_k}\frac{dz_k}{\rho_k^2} \\ 0 & -\frac{r_k}{\rho_k^2} \\ 1 & 0 \\ 0 & 1 \end{bmatrix}$$

The covariance matrices $\Lambda$ are diagonal with on the diagonal the terms $\Lambda_{ALRFM} = \text{diag}\,[\sigma_x^2, \sigma_y^2, \sigma_z^2, \sigma_\rho^2, \sigma_\psi^2, \sigma_\theta^2]$ in ARFM and $\Lambda_{PLRFM} = \text{diag}\,[\sigma_x^2, \sigma_y^2, \sigma_z^2, \sigma_\psi^2, \sigma_\theta^2]$ in PRFM. In these expressions:

$dx_k = x_k - x_0 = \rho \cos\psi \cos\theta$ $dy_k = y_k - y_0 = \rho \sin\psi \cos\theta$ $dz_k = z_k - z_0 = \rho \sin\theta$ $\rho_k \sqrt{r_k^2 + (z_k - z_0)^2}$ $r_k = \sqrt{(x_k - x_0)^2 + (y_k - y_0)^2}$ Evaluations carried out on several scenarios show that the estimation of the defects of bias (more precisely of their modulus) is favored with rectilinear trajectories going toward the point $G_0$ or passing by an object $G_0$ situated nearly plumb with the trajectory.

Implementation of the Process with Variability of the Parameters Estimated According to Operating Conditions In the various applications proposed, it is possible to introduce the variability of the operating conditions in the modeling and estimation processes. Accordingly, the modeling introduces a dependency of the parameters on the thermomechanical conditions logged.

Thus when study of the system shows that the values of the calibration parameter to be estimated are sensitive to the operating conditions, this parameter is modeled with a dependency on the thermomechanical conditions. In a simple manner, use is made of a polynomial modeling which exhibits the advantage of preserving the linearity of the system to be solved with regard to the parameters to be estimated. For example the evolution of the parameter "a" with temperature is written using a finite expansion, limited to order N, about a mean temperature of use $T_0$ in the form:

$$a(T) = \sum_{n=0}^{N} a_n (T - T_0)^n$$

By limiting the expansion to first order, the estimation of $a_0$ consists in solving a system identical to the above, which is independent of the thermal conditions. To first order, measurement of the temperature T allows the estimation of the coefficient $a_1$, the thermal drift of the parameter "a".

In the proposed applications, the performances obtained in typical scenarios are:

for the angles of mounting of the measurement instrument on the platform, of the order of 1‰ of their value;

for the biases of measurements of the order of a few % of their value. This is for angular measurements provided by inertial components, for distance measurements provided by a telemeter and also for the scale factors existing in the magnitudes measured.

Applied to location, this method makes it possible to maintain decametric accuracy in location for recognition and designation of objectives on the ground in the presence of bias.

The proposed method may be implemented under the following conditions:

either in a supervised manner, in an approach to a zone of interest, the supervisor of the airborne optronic system decides to establish a calibration of the measurement system. It then decides an appropriate zone (VC) in which the lock-on point $G_0$ is searched for. The point $G_0$ may be chosen by the supervisor (as well as optionally the other points $G_1$, $G_2$, etc.), or in an automatic manner, in a mode where the sensor is available in the sense that it is not utilized for an operational function. Having regard to the trajectory of the aircraft, an appropriate zone is defined in which the lock-on point $G_0$ is chosen automatically by an image processing which searches for a contrasted point in this zone and optionally verifies the presence of other points $G_1$, $G_2$, . . . , nearby.

The measured defects are optionally compared with the historical log of the previous evaluations and a current correction is evaluated. The correction is applied to the following measurements of the measurement instrument, obtained for example outside of this calibration method.

In a terrestrial system such as for example a portable camera, it is possible by virtue of the method to locate a target by means of a magnetic compass and of a telemeter without having to estimate the local magnetic declination. Accordingly, a characteristic ground point $G_0$ is sighted, on which two ensembles of measurements from two different positions $P_1$, $P_2$ are carried out by displacing the camera. These positions are for example provided by a positioning system such as a GPS. In this case the image acquisition device does not necessarily record said images. In this form the correction makes it possible to evaluate the local declination and to utilize the information with a view to locating other points of the scene $G_1$, $G_2$, . . . , in a wide zone around which the calibration took place.

Figure 2:
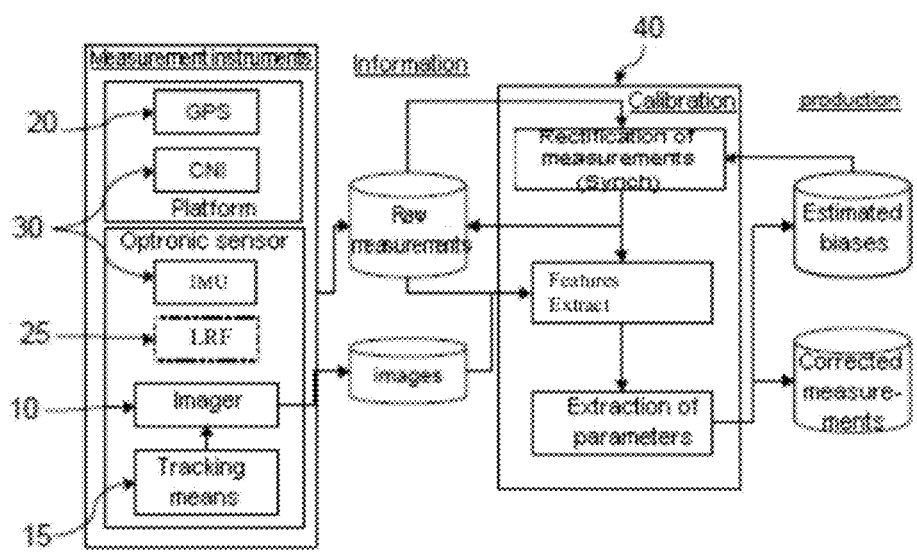

An exemplary optronic system equipped with means for calibrating a measurement instrument has been represented in FIG. 2.

It comprises:

a device 10 for acquiring images of a scene comprising a fixed object $G_0$; this device for acquiring images does not necessarily record said images;

manual or automatic means 15 for tracking the fixed object $G_0$ during the acquisition of these images;

at least one instrument for measuring the distance 25 and/or one instrument for measuring angles of orientation and/or of attitude 30 between this measurement instrument and the fixed object $G_0$, according to a line of sight LoS. This instrument has to be calibrated;

positioning means 20 able to provide the positions $P_1$, $P_2$, . . . $P_i$, . . . , $P_j$, . . . of the system, a device 41 for rectification and synchronization of the measurements with these positions. The rectification consists in particular in applying the corrections estimated by the calibration process, a calculation unit 40 able to estimate the measurement defects which minimize the dispersion of at least two points of intersection $G_{ij}$ between the LoS at the position $P_i$ and the LoS at the position $P_j$, as a function of said measurements and of the positions $P_i$, $P_j$ of the system and able to apply the estimated defects to the measurements.

The invention claimed is:

1. A method for calibrating measurement instruments of an optronic system in motion, with positions $P_1$, $P_2$, . . . , $P_i$, . . . , the optronic system-comprising a device for acquiring images of a scene comprising a fixed object $G_0$, and means for tracking the fixed object $G_0$ during the acquisition of these images, means for obtaining the positions $P_1$, $P_2$, . . . , at least one instrument for measuring the distance and/or an instrument for measuring angles of orientation and/or of attitude between this measurement instrument and the fixed object $G_0$, according to a line of sight LoS, wherein the method comprises the following steps:

acquisition at instants $t_1$, $t_2$, . . . of at least two images, each image being acquired on the basis of different positions $P_1$, $P_2$, . . . of the system, the fixed object $G_0$ being sighted in each image, but its position being unknown, acquisition at the instants $t'_1$, $t'_2$, . . . of measurements of distance and/or of angle, synchronization of the measurements of distance and/or of angle with the positions $P_1$, $P_2$, . . . established at instants $t_1$, $t_2$, . . . , estimation of the measurement defects which minimize the dispersion of at least two points of intersection $G_{ij}$ between the LoS at the position $P_i$ and the LoS at the position $P_j$, as a function of said measurements and of the known positions $P_i$, $P_j$ of the system.

2. The calibration method as claimed in claim 1, wherein $G_0$ is at the center of the images.

3. The calibration method as claimed in claim 1, the preceding claims, wherein the sole calibrated measurement instrument is an instrument for measuring angles of orientation and/or of attitude, and the measurements are acquired on the basis of at least three different positions $P_1$, $P_2$, $P_3$.

4. The calibration method as claimed in claim 1, wherein the sole calibrated measurement instrument is a telemeter, and the measurements are acquired on the basis of at least two different positions.

5. The calibration method as claimed claim 1, wherein, at least one other fixed object $G_1$ being visible on at least two images, it furthermore comprises a step of matching in each image of the fixed objects $G_0$, $G_1$, the step of calculating the measurement defects furthermore being carried out as a function of predetermined characteristics internal to the image acquisition device.

6. The calibration method as claimed in claim 1, further comprising optimizing the measurement conditions which is based on the determination of an optimal trajectory of the sensor for a known position of the object $G_0$, or on the determination of a zone to be favored for the search for the object $G_0$.

7. The calibration method as claimed claim 1, further comprising calculating the geographical position of $G_0$ and optionally of the other fixed objects, on the basis of the calibrated measurements.

8. The calibration method as claimed in claim 1, further comprising pointing at the fixed object $G_0$.

9. The calibration method as claimed in claim 1, further comprising applying the estimated defects to the distance measurement instrument and/or to the instrument for measuring angles of orientation and/or of attitude so as to benefit from corrected measurements.

10. An optronic system able to be displaced, which comprises:
  a device for acquiring images of a scene comprising a fixed object $G_0$, and
  means for tracking the fixed object $G_0$ during the acquisition of these images,
  means for obtaining the positions $P_1$, $P_2$, . . . .
  at least one instrument for measuring the distance and/or one instrument for measuring angles of orientation and/or of attitude between this measurement instrument and the fixed object $G_0$, according to a line of sight LoS,
  further comprising means for implementing the method as claimed in claim 1.

* * * * *

UNITED STATES PATENT AND TRADEMARK OFFICE
CERTIFICATE OF CORRECTION

| | |
|---|---|
| PATENT NO. | : 9,030,552 B2 |
| APPLICATION NO. | : 13/516731 |
| DATED | : May 12, 2015 |
| INVENTOR(S) | : Alain Simon |

It is certified that error appears in the above-identified patent and that said Letters Patent is hereby corrected as shown below:

In the claims:

Col. 25 lines 5-6 please replace "claimed in claim 1, the preceding claims, wherein" with --claimed in claim 1, wherein--.

Col. 25 line 14 please replace "claimed claim 1" with --claimed in claim 1--.

Col. 26 line 1 please replace "claimed claim 1" with --claimed in claim 1--.

Signed and Sealed this
First Day of September, 2015

Michelle K. Lee
*Director of the United States Patent and Trademark Office*